No. 827,509. PATENTED JULY 31, 1906.
J. L. CREVELING.
FAN AND MOTOR FOR OPERATING THE SAME BY COMPRESSED AIR.
APPLICATION FILED MAY 10, 1901.
Fig. I.
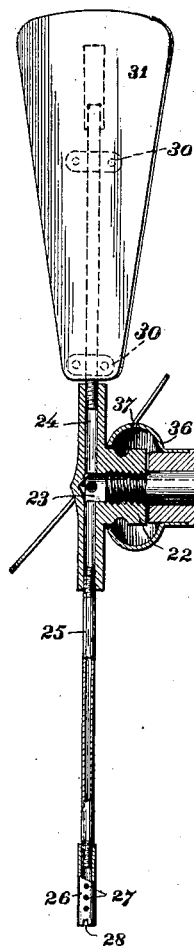
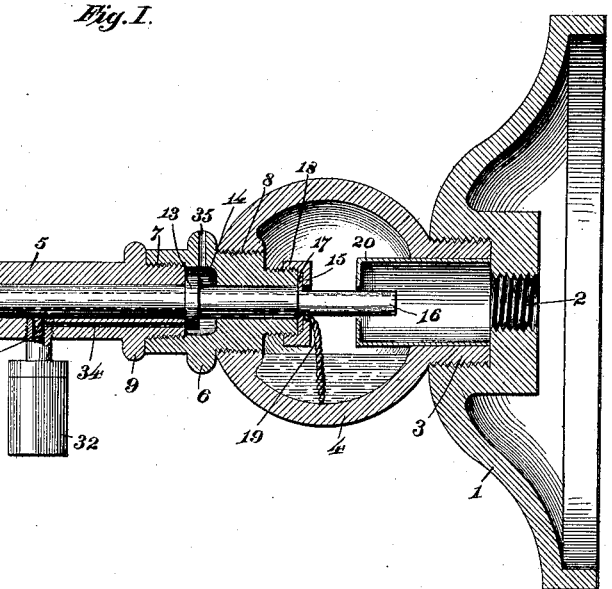
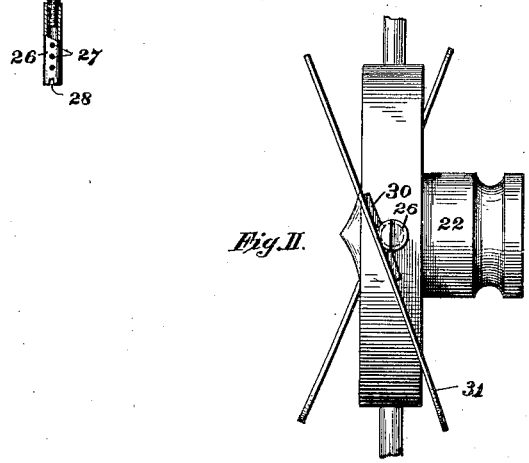
Fig. II.
Witnesses
H. S. Austin
Karl J. Daniel
Inventor
John L. Creveling,
by
Joseph T. Atkins
Attorney
THE NORRIS PETERS CO., WASHINGTON, D. C.

UNITED STATES PATENT OFFICE.

JOHN L. CREVELING, OF NEW YORK, N. Y., ASSIGNOR TO SAFETY CAR HEATING & LIGHTING COMPANY, A CORPORATION OF NEW JERSEY.

FAN AND MOTOR FOR OPERATING THE SAME BY COMPRESSED AIR.

No. 827,509.  Specification of Letters Patent.  Patented July 31, 1906.

Application filed May 10, 1901. Serial No. 59,603.

*To all whom it may concern:*

Be it known that I, JOHN L. CREVELING, of New York, in the county of New York, State of New York, have invented certain new and useful Improvements in Fans and Motors for Operating the Same by Compressed Air, of which the following is a complete specification, reference being had to the accompanying drawings.

The object of my invention is to produce a fan-motor adapted to be driven by compressed air operating upon the reaction principle, in which provision is made for keeping the bearings of the machine well lubricated, for preventing the blowing out of the lubricant under air-pressure, and for reducing friction in operation.

In the accompanying drawings, Figure I is a longitudinal sectional view of a preferred form of embodiment of my invention, certain of the parts being shown in elevation. Fig. II is a side elevation of a portion of the fan-head detached.

Referring to the numerals on the drawings, 1 indicates a base or supporting member, which may be of any preferred shape and dimensions and designed to be supported in any desired position. It is provided with an air-inlet 2, designed in practice to communicate with a source of compressed-air supply. (Not illustrated.) Threaded or otherwise secured to the base 1 is a nipple 3 of a preferably spherical shell 4, to the end of which, preferably opposite the inlet 2, is secured a bearing member 5, preferably through the intervention of a coupling 6, the coupling being threaded, as indicated at 7, to the bearing member 5 and, as indicated at 8, to the shell 4. A rib 9 on the bearing member is preferably provided as an abutment thereon for the end of the coupling member 6. Extending through the bearing member 5 and the coupling 6 I provide a hollow shaft 12, to which is fixed a bearing or collar 13, that works loosely within a cavity 14, provided for it in the coupling 6, and against the end of the bearing member 5, which closes one side of said cavity. From a plane (indicated at 15) flush with the inner end of the coupling 6 the shaft 12 terminates in a reduced portion 16. Against the end of the shoulder (indicated at 15) and the end of the coupling 6 flush therewith is secured a washer 17, preferably made of rawhide, the same being retained in place, as by a screw-cap 18, threaded to the inner end of the coupling 6.

19 indicates a lubricant-feed, which may be of wicking and is adapted by capillarity to supply oil from the interior of the shell 4 to the washer 17, which is the only bearing in the coupling 6, the coupling being preferably bored with a small clearance for the shaft 12.

The reduced end 16 of the shaft 12 works loosely in the cap 18 and in the end of a shield 20, which may consist of a shell of spun brass slipped into the bore of the nipple 3. The adjacent ends of the coupling 6 and of the shield 20 project toward each other into the interior of the shell 4, and thereby provide means for holding a volume of oil within the shell 4 in whatever position it may be set without bringing it into direct contact with the shaft 12 or the reduced end 16 thereof.

Upon the outer end of the shaft 12 I provide a fan-head 22, which is preferably threaded to the end of the shaft, as illustrated, and which is provided with a central bore 23, that communicates with cross or branch bores 24, corresponding in number to the number of vanes with which the fan is provided. I prefer to employ four vanes, and therefore illustrate four tubular arms 25, each of which communicates with its respective branch bore 24. The ends of the respective arms 25 are closed, preferably by elongated screw-caps 26, each of which is provided with a series of lateral apertures 27 and with a kerf 28, by which it may be conveniently removed for cleaning or for the substitution of other caps having apertures 27 of different sizes to meet the requirements of the air-pressure available in practice.

Each of the arms 25 is secured, as by straps 30, to a vane 31. The vanes may be adapted to be easily removed when required and to be adjusted at any required angle.

32 indicates an oil-cup, preferably suspended from the bearing member 5 and supporting in contact with the shaft 12 a wick or other capillary feed 33.

34 indicates a tube filled with wicking, which establishes capillary communication between the wick 33 and the inner face of the collar 13.

35 indicates an air-vent establishing communication between the interior of the cavity 14 and the outside atmosphere.

36 indicates an annular sheath which being revolubly fitted to the end of the bearing member 5 is provided with an air-vent 37. The sheath 36 is preferably made of spun brass.

In operation air is supplied through the inlet 2 to the interior of the shield 20, whence it finds egress through the shaft 12 and fan-head 22 to the hollow arms 25 thereof. Issuing thence through the lateral apertures 27 in the caps 26, which close the ends of the arms, it operates upon the reaction principle to impart rotation to the fan-head and to drive the vanes 31, which constitute the fan. The end thrust upon the shaft 12, produced by the rotation of the fan, tends to equalize the end thrust in the opposite direction produced by the air-supply, and thereby to reduce to a minimum friction generated in the operation of the fan. There is of course a tendency upon the part of the high-pressure air-supply within the shell 4 to leak between the shaft 12 and the coupling 6; but this passage is blocked by the washer 17, which is kept oiled by the feed 19 and which cannot be freely enough supplied with oil on account of the oil being brought up only by capillary attraction through the leather of which the washer 17 is made to allow any oil to blow through, and thus exhaust the supply within the shell 4. If any leakage occurs, the air will simply pass through into the cavity 14 and thence to the atmosphere without causing any high pressure within the cavity, and thus there is no tendency to blow the oil out of the thrust bearing or collar 13. I find that for the capillary feed 23 a soft piece of wood having capillary holes drilled longitudinally through it will work well. The main bearing can of course be kept well oiled by use of any well-known cups employed for electric motors, one being indicated at 32 in Fig. I of the drawings.

The sheath 36 is provided upon the end of the bearing 5 as a protection against the introducing of dust and also to catch any drip of oil which might occur at the end of the bearing member 5. If any considerable quantity of oil should accumulate in the bottom of the sheath 36, it may be readily drained off by turning the sheath until its vent 37 may make discharge thereof by gravity.

What I claim is—

1. The combination with a bearing member, its support, and an intermediate shell, of a hollow shaft, a reaction-fan thereon, means of air-supply to one end of the shaft, and oppositely-projecting members within the shell adapting the shell to hold a supply of oil out of direct contact with the shaft.

2. The combination with a bearing member, support, intermediate shell, and hollow shaft provided with a reaction-fan, of a shoulder on the shaft flush with the end of the bearing member, a washer secured against the shoulder and end of the bearing member, and a lubricant-feed communicating with the washer in proximity to the shaft.

3. The combination with a bearing member and its support, of a hollow shaft in the bearing member, a collar secured to the shaft and working against the end of the bearing member, and a reaction fan-head secured to the shaft.

4. The combination with a hollow shaft and means for supporting it, of a fan-head provided with hollow arms, and screw-caps upon the ends of said arms, respectively, provided with a series of lateral apertures.

5. The combination with a base or support, shell, coupling, and bearing member, the shell and coupling being provided between them with a cavity and air-vent, of a hollow shaft provided with a collar working in the cavity between the bearing member and coupling, and with a washer between it and the bearing member, a reaction-fan on the shaft, and capillary lubricant-feeds operatively communicating with the collar and washer, respectively.

In testimony of all which I have hereunto subscribed my name.

JOHN L. CREVELING.

Witnesses:
C. A. McCune,
F. E. Kessinger.